United States Patent

[11] 3,596,697

| [72] | Inventors | Virgil L. Hansley<br>Cincinnati, Ohio;<br>Raymond G. Newberg, Wyoming, Ohio;<br>Fred K. Morgan, Cold Springs, Ky. |
|---|---|---|
| [21] | Appl. No. | 725,894 |
| [22] | Filed | May 1, 1968 |
| [45] | Patented | Aug. 3, 1971 |
| [73] | Assignee | National Distillers and Chemical Corporation<br>New York, N.Y. |

[54] BLENDS OR RUBBERY POLYMERS
16 Claims, No Drawings

[52] U.S. Cl. ........................................ 152/330,
260/33.6, 260/41.5, 260/94.2, 260/894
[51] Int. Cl. ........................................ C08d 11/02,
C08d 9/02, B60c 11/00
[50] Field of Search............................. 260/894,
94.2 M, 33.6 A, 41.5; 152/330

[56] References Cited
UNITED STATES PATENTS
3,067,187 12/1962 Greenberg et al. ........... 260/82.1
OTHER REFERENCES
Whitby- Synthetic Rubber- (Wiley) (N.Y.) (1954), pages 750—752

Primary Examiner—Morris Liebman
Assistant Examiner—H. H. Fletcher
Attorney—Allen A. Meyer, Jr.

ABSTRACT: Rubber polymers prepared by polymerizing conjugated diolefinic compounds alone or with other suitable monomers in the presence of an alfin catalyst and a molecular weight control agent are blended with styrene-butadiene rubber to provide novel compositions useful in tire tread formulations.

BLENDS OR RUBBERY POLYMERS

This invention relates generally to novel rubber blends for use in a variety of products including pneumatic tires for all types of land and air vehicles. More particularly, the present invention relates to rubber compositions comprising blends of molecular weight controlled, alfin-catalyzed rubber polymers and styrene butadiene rubbers and to processes for making the same.

Styrene-butadiene rubbers (hereinafter referred to as "SBR") were developed during World War II as a substitute for natural rubber and were formerly identified as GR–S. SBR is the most common synthetic rubber produced and methods of manufacturing SBR are well-known in the rubber industry. Conventional manufacture of SBR usually involves copolymerization of about 3 parts butadiene with about 1 part styrene. These materials are suspended in finely-divided emulsion form in a large proportion of water, in the presence of some type of soap or detergent, a suitable initiator or catalyst (usually a peroxide) and a chain modifying agent (usually a mercaptan) during polymerization. By using a suitable redox system such as ferrous sulfate, dextrose and a complex phosphate, polymerization may be achieved at a temperature of about 40° F. The latter type of polymerization is known as cold-rubber production. For purposes of the present invention, any of the conventional SBR rubbers containing from 5 to 40 percent by weight of styrene are useful.

Synthetic rubbers and polymers prepared by polymerizing olefins and diolefins in the presence of alfin catalyst have been known for many years. Such polymers or rubbers have been referred to as "alfin rubbers" and to the rubber industry meant extremely high molecular weight products, i.e., polymers having a molecular weight in the range of 5—10 million or higher. Although these polymers possess many desirable properties, e.g., excellent wear resistance, they are exceedingly difficult, if not impossible, to process on existing machinery under standard processing conditions.

Recently, it has been found possible to control the molecular weight of alfin-catalyzed polymers. In U.S. Pat. No. 3,067,187 various dihydro derivatives of aromatic compounds were employed in alfin-catalyzed polymerizations to produce useful rubbers having molecular weights in the range of about 50,000 to about 1,250,000, from, for example, butadiene, isoprene, styrene, piperylene and varying combinations of two or more of these. The microstructures of such molecular weight controlled, alfin-catalyzed polymers remained substantially the same as those of alfin-catalyzed polymers in which the molecular weight was not controlled.

It has now been discovered that alfin-catalyzed, molecular weight controlled rubber polymers may be blended with SBR to provide products of extremely good wear characteristics and processability. Specifically, alfin-catalyzed, molecular weight controlled rubber polymers, as hereinafter described, are blended with from 50 to 95 percent by weight, based on the total weight of the blend, of SBR to provide the novel blends of the present invention. Such blends of molecular weight controlled, alfin-catalyzed polymers and SBR produce new and useful products having a combination of characteristics and properties which were heretofore unknown. A preferred embodiment of the present invention comprises a molecular weight controlled, alfin-catalyzed polymer having a Mooney viscosity of from 30—80 blended with from about 50 to about 95percent by weight, based on the total weight of the blend, of SBR.

A process preparing molecular weight controlled, alfin-catalyzed polymers useful in the novel blends of the present invention is generally described in U.S. Pat. No. 3,067,187. This process involves polymerizing suitable monomer or monomers in the presence of an alfin catalyst, a molecular weight control agent and an inert hydrocarbon diluent. Examples of suitable hydrocarbon diluents include pentane, hexane, cyclohexane, decaline and mixtures thereof, with higher boiling solvents preferred. Particularly good results have been obtained with substantially pure branch chain aliphatic hydrocarbons, since alfin catalyst activities are greater in the presence of such materials as compared to catalyst activities in normal chain aliphatic hydrocarbons.

Molecular weight controlled, alfin-catalyzed polymers useful in the blends of the present invention may be prepared from conjugated diolefinic compounds having no more than 12 carbon atoms, preferably 4—12 carbon atoms such as, e.g., 1,3-butadiene or isoprene or the copolymerization of such diolefinic compounds with other diolefinic compounds or with other polymerizable monomers, such as styrene. Other monomeric materials used to prepare the molecular weight controlled, alfin-catalyzed polymers useful in the present invention, include, for example, other butadienes such as 2,3-dimethyl-1.3-butadiene, piperylene, 3-furyl-1,3-butadiene, 3-methoxy-1, 3-butadiene, and the like; aryl olefins such as styrene and various alkyl styrenes, p-methoxystyrene, alpha-methylstyrene, vinylnaphthalene, and the like; vinylcyclobutane, vinylcyclopentane and other unsaturated hydrocarbons. Polymers of 1,3-butadiene and copolymers of 1,3-butadiene with styrene and isoprene are particularly useful. Where the polymers are to be used in blends for tire treads the proportion of butadiene and/or other conjugated diolefinic compounds in the molecular weight controlled, alfin-catalyzed polymer should ordinarily be at least 50percent by weight of the polymer.

The term "alfin-catalyzed polymer" as used herein shall mean a polymer prepared in the presence of an alfin catalyst which comprises an intimate mixture of a sodium alkenyl compound, a sodium alkoxide, and an alkyl metal halide such as for example, a mixture of sodium isopropoxide, allyl sodium, and sodium chloride. Such alfin catalysts may be prepared by (1) reacting amyl chloride with sodium and subsequently (2) reacting the product of (1) with a methyl alkyl carbonyl and an olefin. The preparation of such alfin catalyst is described in more detail in U.S. Pat. No. 3,067,187 and U.S. Pat. application Ser. No. 271,487 filed Apr. 8, 1963 now U.S. Pat. No. 3,317,437.

The molecular weights of polymers prepared in the presence of an alfin catalyst can be controlled, as disclosed in U.S. Pat. No. 3,067,187, when certain molecular weight control agents or, more specifically, certain dihydro derivatives of aromatic hydrocarbons are present during polymerization. These alfin-catalyzed polymerizations give polymer final products having high elastomer content with low intrinsic viscosity.

The dihydro derivatives of aromatic hydrocarbons disclosed in U.S. Pat. No. 3,067,187 as being useful as molecular weight control agents include 1,4-dihydrobenzene, 1,4-dihydronaphthalene, 1,2-dihydrobenzene, dihydrotoluene, dihydroxylene, and the like, and mixtures of these. Particularly good results were achieved with 1,4-dihydrobenzene and 1,4-dihydronaphthalene.

In preparing the alfin catalyzed polymers to be used in the rubber blends of the present invention, the type of molecular weight control agent and the amount used should be selected so that alfin-catalyzed polymers having a molecular weight of less than about 2,000,000 is produced. Preferably the alfin-catalyzed polymers should have a molecular weight in a range of about 200,000 to about 750,000 and a Mooney viscosity within the range of from about 30 to about 80.

The amount of molecular weight control agent required to produce a polymer having a given molecular weight or Mooney viscosity value is dependent upon, in addition to the type of molecular weight control agent used, such factors as temperature and pressure of the reaction and the quantity and type of diluent employed. In general, the amount of molecular weight control agent used may vary from about 1 to 80 percent, based on the weight of the monomer; the usual amount being within the range of about 1.5 to about 6 percent. It is to be understood that the type and amount of any particular molecular weight control agent as well as other process conditions used in preparing alfin-catalyzed polymers is not an essential feature of this invention, except that the polymers produced have a molecular weight of less than about 2,000,000.

In accordance with the process of the present invention, novel rubber blends are prepared by incorporating into an SBR rubber from about 5 percent to about 50 percent by weight, based on the total weight of the blend, of an alfin catalyzed polymer. The alfin-catalyzed polymers and SBR may be blended together in existing commercial rubber processing machinery such as Banbury mixers or roll mills, employing conventional techniques.

In another embodiment of the present invention the alfin-catalyzed polymer is incorporated into the SBR while the former is still in the "cement stage". The "cement stage" may be defined as the product discharged from the polymerization reactor before removal of the inert hydrocarbon diluent. Such a product contains a rubber solids concentration of about 1 to about 30 percent by weight. The alfin-catalyzed rubber polymer may be added to the SBR in the cement stage in any convenient manner. For example, the alfin-catalyzed polymer can be pumped into a stirred tank containing the SBR while continuing to stir the tank and while maintaining the temperature of the tank in the range of about 50° F. to 250° F. The combination of SBR and cement stage alfin-catalyzed polymers should be stirred until the SBR is thoroughly homogenized with the alfin-catalyzed polymer. After the alfin-catalyzed polymer has been thoroughly blended into the SBR, the hydrocarbon diluent is removed in a suitable diluent recovery operation and a solid rubbery product comprising a blend of SBR and alfin-catalyzed polymer is obtained.

It has been found that for many applications and in particular for use in tire tread formulations, the alfin-catalyzed polymers used in the blends of the present invention may be oil extended, i.e., from about 30 parts up to about 150 parts of oil per 100 parts of alfin-catalyzed polymer may be added to extend said polymer. For tire tread stock, a practical upper limit is about 80 to 100 parts of oil per 100 parts of alfin-catalyzed polymer.

In general, any of the commercially available extender oils available today are applicable and useful for extending the alfin-catalyzed polymers used in the blends of the present invention. Preferably the extender is an oily liquid hydrocarbon such as a mineral oil having a boiling point well above the temperatures to be encountered in use; for ordinary uses the extenders oil should not boil below about 450° F. and preferably should not boil below about 550° to 600° F. Examples of various useful oily liquid hydrocarbon extenders are shown in Table I below.

same into the alfin-catalyzed polymer while the latter is in the cement stage or by mixing the same into the rubber blends utilizing processing machinery such as Banbury mixers and roll mills.

In the production of blends for use in tire treads formulations any of the conventional carbon blacks may be incorporated either in the cement stage or in the rubber blends after removal of the diluent. While any of the carbon blacks including the furnace blacks, channel blacks and even thermatomic can be used to obtain compounds suitable for many purposes, the fine reinforcing furnace blacks generally have properties which are superior to others. Examples of furnace blacks particularly useful in alfin rubber formulation for tire treads include for example the following high abrasion furnace blacks (HAF) and intermediate super abrasion furnace black (ISAF):

TABLE II

| Trade name | Manufacturer | Type | Particle size, millimicrons | Surface area, sq. m./gm. |
| --- | --- | --- | --- | --- |
| Vulcan 6 | Cabot Corp | ISAF | 23 | 115 |
| Vulcan 3 | do | HAF | 29 | 75 |
| Statex 125-H | Columbian Carbon | ISAF | | |

In addition to carbon black, other fillers, pigments and additives may be compounded into the rubber blends of the present invention such as, for example, kaolin clays, Whiting ($CaCO_3$), Lithopone (30percent $ZnS_2$ and 70percent $BaSO_4$), Dolomite ($CaCO_3$ and $MgCO_3$), zinc oxide, titanium dioxide, "Hysil" (silicone dioxide) and the like. Carbon black and/or other fillers and pigments may be added in amounts as high as 80 parts or higher per 100 parts of the rubber blend to produce useful products.

In tire tread formulations, the amount of carbon black used is preferably about 50 percent to 150 percent by weight based on the total amount of rubber blend present in the composition. Other amounts are also useful. Part of the carbon black may be substituted by other pigments.

More detailed practice of the invention is illustrated by the following examples wherein parts are given by weight unless otherwise specified. These examples and embodiments are illustrative only, and the invention is not intended to be limited thereto, except as indicated by the appended claims. The alfin catalyst used in the following examples was prepared in accordance with the procedure described in U.S. Pat. application Ser. No. 271,487, filed Apr. 8, 1963, now U.S. Pat. No. 3,317,437. Mooney viscosity values in the example were determined by the ASTMD 1646—61 standard test.

TABLE I

| Oil | Manufacturer | Compositions, percent | | | Specific gravity | Pour point, °F. | Flash point, °F. | Aniline point, °F. | Initial boiling point, °F. |
| --- | --- | --- | --- | --- | --- | --- | --- | --- | --- |
| | | Ca | Cn | Cp | | | | | |
| Sundex 790 | Sun Oil Company | 34 | 32 | 34 | 0.979 | +50 | 415 | 117 | |
| Sundex 890 | do | 48 | 8 | 44 | 1.014 | +50 | 415 | 94 | |
| Sundex 8125 | do | 40 | 26 | 34 | 0.997 | +50 | 440 | 115 | |
| Circosol 380 | do | 14 | 41 | 45 | 0.928 | −5 | 395 | 179 | |
| Circo light rubber process oil | do | 20 | 39 | 41 | 0.922 | −40 | 330 | 157 | |
| Dutrex 1726 | Shell Oil Company | 39 | 23 | 38 | 0.9806 | +65 | 440 | 105 | 785 |
| Dutrex 726 | do | 41 | 24 | 35 | 0.9895 | +60 | 425 | 105 | 672 |
| Philrich-5 | Phillips Petroleum Company | | | | 0.9930 | +55 | 480 | 110 | |
| Califlux-GP | Golden Bear Oil Corp | | | | 1.01 | +45 | | | 665 |

[1] Ca=Carbon atoms tied up in aromatic structures; Cn=Carbon atoms tied up in naphthenic structures; Cp=Carbon atoms tied up in paraffinic structures.

The extender oil is preferably added during the cement stage by pumping the alfin-catalyzed polymers to a stirred tank and adding the extender oil while maintaining the stirring. The extender oil may also be added to the alfin-catalyzed polymer in a Banbury mixer or on a roll mill after the diluent has been removed from said polymer.

If desired, in addition to extending oil, other compounding ingredients such as carbon black, zinc oxide, stearic acid, sulfur, accelerators and the like, may be added to the rubber blends of the present invention either by incorporating the

EXAMPLES 1 - 4

Copolymers of butadiene and styrene or isoprene were prepared by polymerizing these monomers in the presence of an alfin catalyst and 1,4-dihydronaphthalene as a molecular weight control agent in accordance with the procedures described in U.S. Pat. No. 3,067,187. The resulting rubber products in three examples were extended by blending with 37.5 parts of Sundex 790 oil for each 100 parts of rubber. In Example 1, 80 percent butadiene was polymerized with 20 percent isoprene and the oil extended product had a Mooney of 54. In Example 2, 85 percent butadiene was polymerized with 15 percent styrene and the non-oil extended product had a Mooney of 72. In Examples 3 and 4, 95 percent butadiene was polymerized with 5 percent isoprene and styrene respectively and the resulting oil extended products had Mooneys of 52 and 48 respectively.

Four samples of the above rubber products were prepared for testing in tire treads. The tire tread formulations were prepared by compounding the various ingredients into the rubber products in a conventional Banbury mixer. Recipes for the tire treads are given below in Table III.

TABLE III

| Ingredients | Examples | | | | |
|---|---|---|---|---|---|
| | 1 | 2 | 3 | 4 | Control |
| 80/20 butadiene/isoprene | 48.2 | | | | |
| 85/15 butadiene/styrene | | 35.0 | | | |
| 95/5 butadiene/isoprene | | | 48.2 | | |
| 95/5 butadiene/styrene | | | | 48.2 | |
| SBR-3770 [1] | 131.0 | 131.0 | 131.0 | 131.0 | 201.0 |
| Statex 125 H [2] | 42.0 | 42.0 | 42.0 | 42.0 | 24.0 |
| Sundex 790 | 9.2 | 20.4 | 8.2 | 8.2 | 15.0 |
| Zinc oxide | 5.0 | 5.0 | 5.0 | 5.0 | 5.0 |
| Stearic acid | 3.0 | 3.0 | 3.0 | 3.0 | 3.0 |
| Agerite H.P. [3] | 1.0 | 1.0 | 1.0 | 1.0 | 1.0 |
| Wax 1115 [4] | 2.0 | 2.0 | 2.0 | 2.0 | 2.0 |
| Diphenylguanidine | 0.2 | 0.2 | 0.2 | 0.2 | 0.2 |
| Santocure N.S. [5] | 0.8 | 0.8 | 0.8 | 0.8 | 0.8 |
| Polymerized sulfur | 2.0 | 2.0 | 2.0 | 2.0 | 2.0 |

[1] 100 parts High Mooney Styrene butadiene rubber; 75 parts ISAF black; 50 parts highly aromatic oil.
[2] Intermediate Super Abrasion High Structure Furnace Black.
[3] 65 parts phenyl B-naphthylamine; 35 parts diphenyl-p-phenylene-diamine.
[4] White slab hydrocarbon paraffin wax.
[5] N-tert-butyl-2-benzothiozolesulfuramide.

Tires having treads prepared from the formulations set forth above in Table III were prepared in accordance with conventional procedures. 8.25×14 four-ply rayon tires were prepared and tested on fleet cars at average speeds of 60—70 miles per hour for 12,000 miles. The load per tire was approximately 1380 lbs. The results of the tire wear tests are presented in Table IV below:

TABLE IV

| | | Wear rating as percent of control | |
|---|---|---|---|
| | Polymer blend | Center line | Overall average |
| Example: | | | |
| Control | 100% SBR-3770 | 100 | 100 |
| 1 | SBR—80/20 butadiene/isoprene | 107 | 108 |
| 2 | SBR—85/15 butadiene/styrene | 107 | 106 |
| 3 | SBR—95/5 butadiene/isoprene | 113 | 112 |
| 4 | SBR—95/5 butadiene/styrene | 114 | 111 |

It is immediately apparent from the results in Table IV above, that tires having treads made from SBR rubber blended with alfin catalyzed polymers in accordance with the present invention have unexpectedly and unusually good wear resistance. In each case, addition of the alfin-catalyzed polymer significantly improves the wear resistance of the SBR. Furthermore, it was observed that addition of the experimental polymers reduced the tendency for tread groove cracking. In addition, drivers of the test cars observed that traction characteristics were improved (skid resistance, braking, cornering, etc.) over the SBR control.

What we claim is:

1. A composition comprising a blend of (A) an alfin-catalyzed rubbery polymer containing at least about 50 percent by weight of a conjugated diolefin having 4 to 12 carbon atoms and having a molecular weight of above about 200,000 but less than about 2 million and (B) at least 50 percent up to about 95 percent by weight based on the total weight of A & B of an emulsion polymerized styrene-butadiene rubber containing from about 5 to 40 percent by weight of styrene.

2. A composition as defined in claim 1 wherein (a) is a homopolymer of a conjugated diolefin having 4—12 carbon atoms.

3. A composition as defined in claim 2 wherein (A) is a homopolymer of 1,3-butadiene.

4. A composition as defined in claim 1 wherein (A) has a Mooney viscosity (ML 1+4 212° F) of from about 30 to about 80.

5. A composition as defined in claim 1 wherein (A) is a copolymer of butadiene and isoprene containing at least 50 percent by weight of butadiene.

6. A composition as defined in claim 1 wherein (A) is a copolymer of butadiene and styrene containing at least 50 percent by weight of butadiene.

7. A composition as defined in claim 1 comprising, in addition to A & B, at least 30 parts up to about 150 parts per 100 parts of A of an oily liquid hydrocarbon.

8. A pneumatic tire having at least a tread portion which includes a vulcanized synthetic rubber composition comprising (A) a blend of an alfin-catalyzed rubbery polymer containing at least about 50 percent by weight of a conjugated diolefin having 4 to 12 carbon atoms and having a molecular weight of above about 200,000 but less than about 2 million and at least 50 percent up to about 95 percent by weight based on the total weight of said blend of an emulsion polymerized styrene-butadiene rubber containing from 5 to 40 percent by weight of styrene and (B) from about 50 to 150 percent by weight based on the total weight of said rubber composition of carbon black.

9. A pneumatic tire as defined in claim 8 wherein (A) is a homopolymer of a conjugated diolefin having 4—12 carbon atoms.

10. A pneumatic tire as defined in claim 9 wherein (A) is a homopolymer of 1,3-butadiene.

11. A pneumatic tire as defined in claim 8 wherein (A) has a Mooney viscosity (ML 1+4 212° F) of from about 30 to about 80.

12. A pneumatic tire as defined in claim 8 wherein (A) is a copolymer of butadiene and isoprene containing at least 50 percent by weight of butadiene.

13. A pneumatic tire as defined in claim 8 wherein (A) is a copolymer of butadiene and styrene containing at least 50 percent by weight of butadiene.

14. A pneumatic tire as defined in claim 10 wherein said rubber composition comprises, in addition to A & B, at least 30 parts up to about 150 parts per 100 parts of A of an oily liquid hydrocarbon.

15. A pneumatic tire as defined in claim 8 wherein said carbon black is high abrasion furnace carbon black.

16. A pneumatic tire as defined in claim 8 wherein said carbon black is intermediate super abrasion furnace carbon black.